April 26, 1960 J. F. JOHNSON ET AL 2,934,679
CIRCUIT BREAKER LOAD-CENTER
Filed April 30, 1958 2 Sheets-Sheet 1

INVENTORS
JOSEPH F. JOHNSON,
ALBERT H. VEITCH
BY Robert H. Casey
ATTORNEY

United States Patent Office 2,934,679
Patented Apr. 26, 1960

2,934,679
CIRCUIT BREAKER LOAD-CENTER

Joseph F. Johnson and Albert H. Veitch, Plainville, Conn., assignors to General Electric Company, a corporation of New York Application April 30, 1958, Serial No. 732,049

1 Claim. (Cl. 317—119)

Our invention relates to electric circuit breaker load-centers or panelboards and particularly to load-centers or panelboards adapted to mount plug-in type circuit breakers.

Patent 2,738,446 issued March 13, 1956 to W. J. Fleming, and assigned to the same assignee as the present invention, discloses a circuit breaker load-center having a number of blade-type stationary contacts disposed in a row generally centrally of a supporting plate, and circuit breakers particularly adapted for use therewith. The circuit breakers are engaged with the supporting plate by a hook engagement at one end of the circuit breaker, the breaker being rotated about the hook into a plug-in connection with the blade-type contact.

According to the invention of the above Fleming patent in one form, electrical bus bars are provided having generally U-shaped intermediate portions and transversely offset terminal portions, the U-shaped portions being arranged in nested arrangement to provide pairs of adjacent contact portions of differing electrical identity or "phase."

While the nested U-shaped bus bar arrangement shown in the Fleming patent is a simple and effective way to provide the desired contact portions the mounting, insulating, and terminal provisions of the Fleming disclosure render this form of the invention uneconomical to manufacture. Thus a large amount of conductive material is required. In addition, it is virtually impossible to obtain the oversurface electrical clearance required, with small compact assemblies.

It is an object of the present invention to provide a plug-in type circuit-breaker load-center of the aligned contact blade type which will be capable of meeting most home service-entrance requirements and which will make economical use of conductive and insulating materials.

It is another object of the present invention to provide a 2-phase electric circuit breaker load-center including provision for mounting 2-pole circuit breakers, and utilizing only straight strip material for the conductive portions thereof.

It is another object of the present invention to provide an electric circuit breaker utilizing nested U-shaped strip-type bus bars of differing electrical phases and means for supporting and insulating such bus bars with respect to each other comprising a single rigid molded insulating body.

In accordance with the invention, we provide a circuit breaker load-center comprising an elongated molded body of insulating material having a flat mounting surface on its top wall and an elongated rectangular recess in its back wall, a generally U-shaped conductive bus bar of strip material supported on the top mounting surface and providing two blade-type contacts disposed longitudinally of said insulating body and carrying an electric terminal connector therebetween; a pair of apertures in the molded body extending between the rear recess and the front wall and an elongated generally U-shaped conductive bus bar of strip material having its main portion extending in the rear recess and its blade portions extending through the apertures and projecting in alignment with the blade contact portions of said first U-shaped member, and a cable-connecting terminal mounted on an extension of the second bus bar at one end of said insulating body.

In accordance with another aspect of our invention, we provide a cable-connector shield member molded integral with said insulating body for the connector mounted at one end of the insulating body.

The particular aspects considered to be novel will be pointed out in the appended claim. The construction of the invention in one particular embodiment, however, will be clearly understood by reference to the following detailed description, taken in conjunction with the accompanying drawing, in which:

Figures 1, 2:
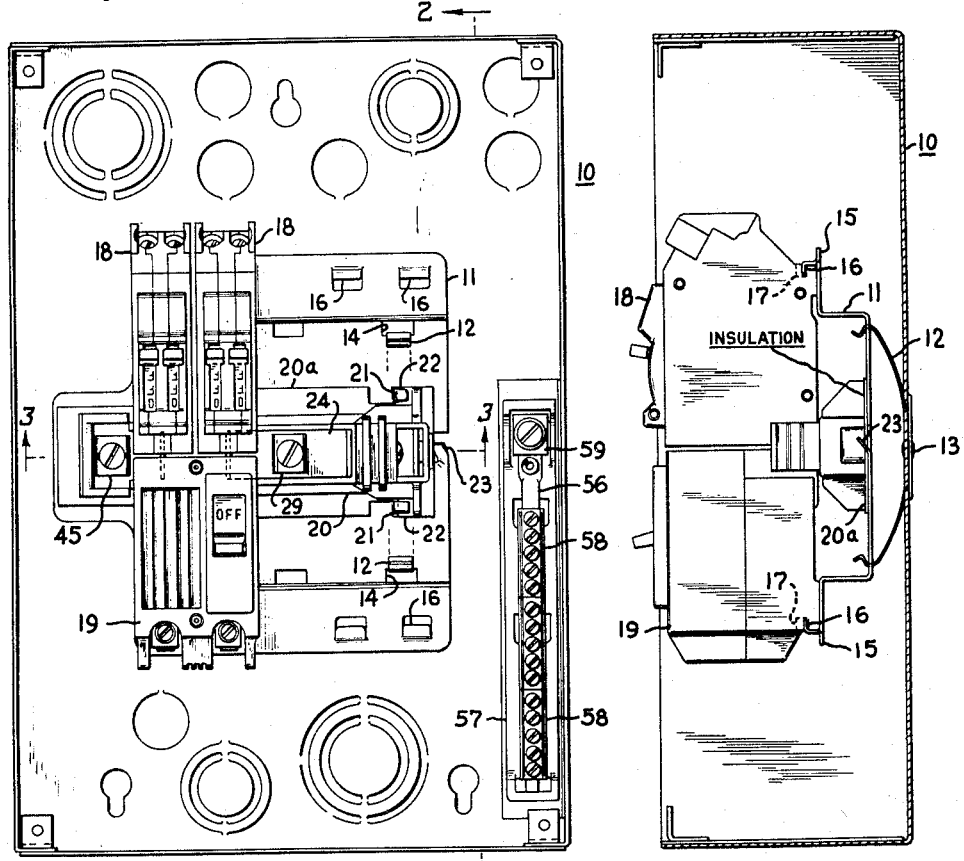
Figure 1 is a top-plan view of an electric circuit breaker load-center incorporating the present invention, with three circuit breakers in place, the cover of the enclosure being omitted.
Figure 2 is a sectional view of the circuit breaker load-center of Figure 1 taken on the line 2—2 of Figure 1.
Figure 3:
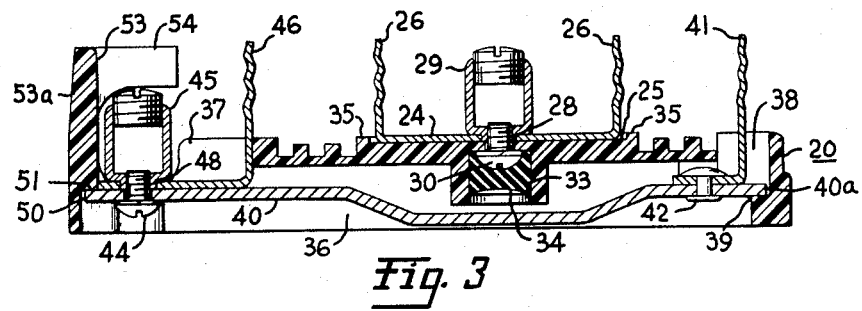
Figure 3 is a sectional view of the insulating base utilized in the load-center of Figure 1 and taken generally on the line 3—3 of Figure 1.
Figure 4:
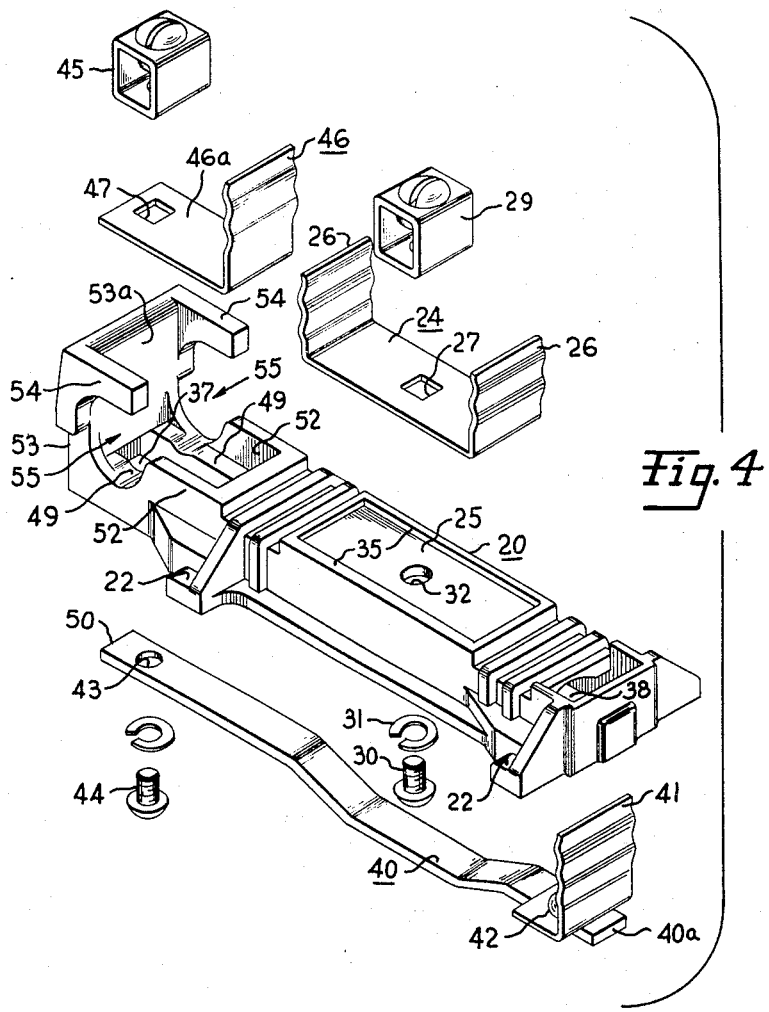
Figure 4 is an exploded perspective view of the insulating base and conductive members of the load-centers of Figure 1.

In the drawings, the invention is shown as embodied in an electric circuit breaker load-center including a rectangular metallic enclosing box 10 having a generally channel-shaped supporting plate 11 resiliently mounted therein by means of arcuate springs clips 12 (only one shown.) The clips 12 are rigidly attached to the back wall of the enclosure 10 such as by means of rivets 13 and each has its inturned ends engaged in apertures 14 in the supporting base 11.

The supporting base 11 includes a pair of outwardly directed flange portions 15 having integral hook-shaped portions 16 for releasably engaging in recesses 17 in the circuit-breakers 18 and 19.

An elongated insulating body 20 is supported in the central portion of the channel-shaped support member 11 by suitable means such as by integral lugs 21 struck out from the back wall of the support member 11 and bent over abutment portions 22 of the base 20. The base 20 is assembled by sliding it under the hook-shaped lugs 21 and is then retained in place by bending up the integral lug 23 which engages an end portion of the insulating base 20 and prevents the base 20 from sliding out from under the lugs 21.

A generally U-shaped conductive strap 24 is supported on a top-mounting surface 25 of the body 20 and has opposed upstanding blade-type contact portions 26 integral therewith and a generally central rectangular aperture 27 adapted to receive a downwardly drawn non-circular collar 28 of the cable-connector 29. The cable-connector 29 is clamped to the U-shaped strap 24 and to the base 20 by means of a screw 30 and washer 31, which screw extends upwardly through an aperture 32 in the insulating base 20 and threadedly engages the bottom wall of the connector 29. The head of the screw 30 is positioned in a recess 33 in the underside of the base 20 and after assembly of the screw 30, the recess 33 is filled over the head of the screw 30 with suitable insulating compound or potting material 34. It will be observed that the mounting surface 25 is provided by a generally rectangular shallow recess in the top wall of the body 20 provided with a circumferential upstanding wall 35. This prevents the conductive strap 24 from turning although mounted by only a single central screw 30.

An elongated, generally rectangular recess 36 is provided in the rear wall of the insulating body 20 and two openings 37 and 38 are provided leading from the recess 36 to the front of the body 20. An abutment 39 is also provided within the recess 36 at one end of the base 20. An elongated, conductive strap 40 is positioned within the recess 36 and extends from end to end of the body 20 and carries an upstanding contact blade 41 rigidly secured thereto at one end by suitable means such as by rivet 42. The end 40a of the strap 40 overlies the abutment 39. The opposite end of the strap 40 is provided with an aperture 43 through which a screw 44 passes, extending upwardly through a portion of the opening 37 and into threaded engagement with a cable-connecting terminal member 45. A generally L-shaped contact blade 46 includes a base portion 46a extending along the upper surface of the strap 40 and between the connector 45 and the strap 40 and has an aperture 47 aligned with the aperture 43 of the strap 40 and of non-circular cross section adapted to receive a corresponding non-circular downwardly drawn collar 48 of the connector 45.

The base portion 46a of the contact blade 46 is substantially wider than the aperture 37 and therefore overlies shoulder portions 49 of the base 20, while the end 50 of the strap 40 underlies an abutment 51 of the base 20, whereby the parts are securely positioned with respect to the base 20 when the screw 44 is in place. The base portion 46a of the contact blade 46 also fits closely between side wall portions 52 of the base 20 whereby the contact blade 46 is maintained in position on the base 20.

The insulating base 20 is provided with an integral terminal shield 53 at one end thereof for protecting the cable connector 45 from accidental contact. The terminal shield 53 includes an upstanding end portion 53a and two opposed overhanging side portions 54 dimensioned to provide cable-entrance portions 55 to permit the insertion of a cable into the cable connector 45 from either side.

It will be observed that although the portions 54 are in effect overhanging portions, they are provided as an integral portion of the molded insulating body 20. This is made possible by spacing the portions 54 farther apart than the base portion at that particular region.

The load-center also includes means for connecting a ground or neutral conductor, comprising a cable connector 59. Means is also provided for connecting the return line of all circuits fed by the circuit breakers and comprising an elongated conductive strip 56 connected to the terminal connector 59 and having a plurality of clamping members 58 slidably mounted thereon and having apertures, not shown, for receiving such conductors. The neutral bar assembly is mounted on a suitable insulating base 57 in the enclosure 10.

The conductor 40 is preferably made of substantially lesser width than the conductor 24 or the blades 41, 46, in order that the recess 36 at the end of the insulating body 20 near the blade 46 may be made relatively narrow compared to the corresponding recess at the top of the base at this point, thereby providing the shoulders 49 on which the contact blade 46 may rest when the strap 40 and the blade 46 are connected together. In addition, this reduced width of the conductor 40 provides additional electrical clearance between it and the conductive strap 24 as measured over the outside surface of the body 20. A sheet of insulating material 20a is also provided on the plate 11 beneath the recess 36 of the base 20.

It will be readily apparent that many modifications of the present invention may be made without departing from the true spirit and scope of the invention, and it is therefore intended by the appended claim to cover all such modifications as fall within the true spirit and scope of the invention.

What we claim as new and desire to secure by Letters Patent of the United States is:

An electric circuit breaker load-center comprising an elongated supporting base having a mounting surface on the top wall thereof and an elongated recess in the rear wall thereof and openings at each end of said base extending from said top wall to said bottom recess, a generally U-shaped bus bar member of relatively wide thin flat strip material having its bight portion mounted on said top mounting surface and having its end portions extending at right angles to said mounting base, an electric terminal connector positioned on said bus bar member at the central portion thereof, mounting means extending through said insulating base from said bottom recess into threaded engagement with said terminal connector to mount said terminal connector and said bus bar member on said base, and a second bus bar assembly comprising an elongated bight portion extending in said bottom recess and opposed upstanding end portions projecting through said openings and beyond said top wall in alignment with said first bus bar end portions, said bight portion of said bus bar having an extension at one end within said rear recess overlying an abutment of said base, said upstanding end portion of said second bus bar opposite said one end including a portion overlying an abutment of said base, said bight portion of said second bus bar having an extension underlying an abutment at said end opposite said one end, and means connecting said upstanding end portion to said bight portion of said bus bar adjacent said last-named abutment.

References Cited in the file of this patent

UNITED STATES PATENTS

| | | |
|---|---|---|
| 2,206,325 | Lomax | July 2, 1940 |
| 2,632,039 | Hammerly | Mar. 17, 1953 |
| 2,647,225 | Cole | July 28, 1953 |
| 2,707,761 | Page | May 3, 1955 |
| 2,737,613 | Morris | Mar. 6, 1956 |
| 2,738,446 | Fleming | Mar. 13, 1956 |
| 2,738,473 | Johnson | Mar. 13, 1956 |
| 2,760,123 | Wills | Aug. 21, 1956 |
| 2,790,113 | Brown | Apr. 23, 1957 |